(No Model.)
J. HARTNESS.
METAL REDUCING TOOL.
No. 543,551. Patented July 30, 1895.
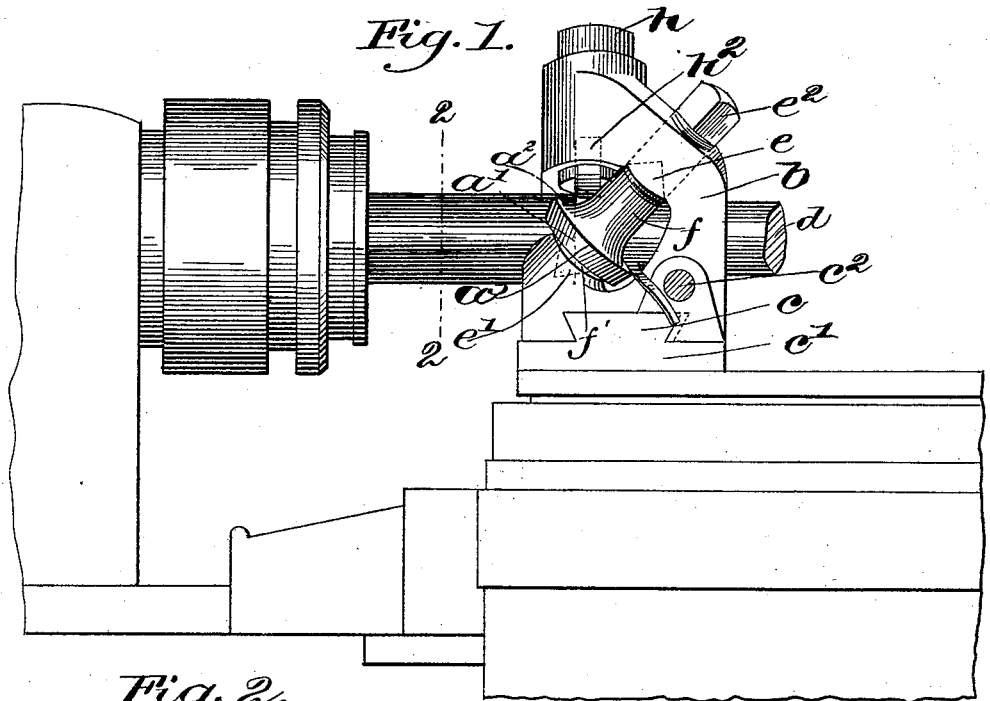
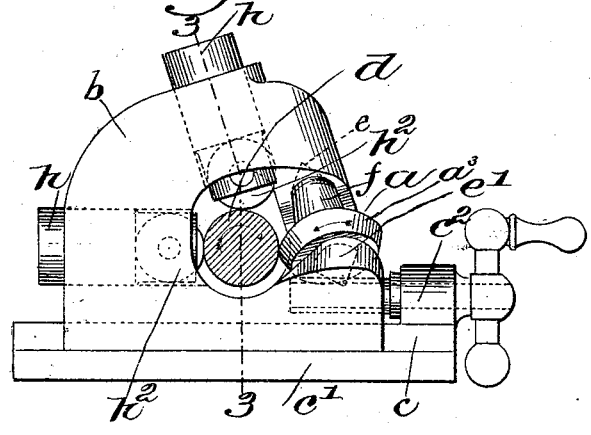
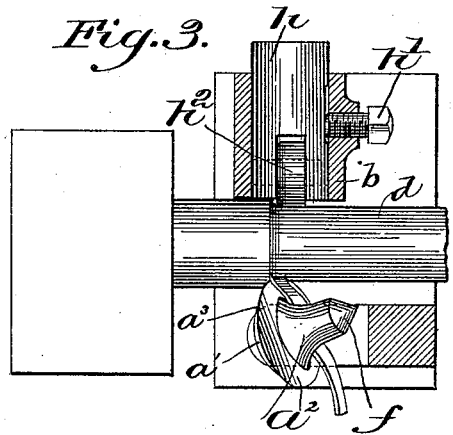
Witnesses:
A. C. Harmon
H. A. Hall
Inventor:
J. Hartness
by Wright Brown Crossley
Attys

UNITED STATES PATENT OFFICE.

JAMES HARTNESS, OF SPRINGFIELD, VERMONT.

METAL-REDUCING TOOL.

SPECIFICATION forming part of Letters Patent No. 543,551, dated July 30, 1895.

Application filed February 27, 1894. Serial No. 501,692. (No model.)

*To all whom it may concern:*

Be it known that I, JAMES HARTNESS, of Springfield, in the county of Windsor and State of Vermont, have invented certain new and useful Improvements in Metal-Reducing Tools, of which the following is a specification.

This invention relates to a metal-reducing appliance having a cutting-tool adapted to reduce a piece of metal by shearing a chip therefrom; and it has for its object to provide a simple, durable, and effective appliance of this class adapted to operate with the minimum degree of resistance and with the minimum development of heat.

The invention consists in the improved construction, which I will now proceed to describe and claim.

Of the accompanying drawings, forming a part of this specification, Figure 1 represents a front elevation of parts of a metal-turning lathe provided with my improvement. Fig. 2 represents a section on line 2 2 of Fig. 1, looking toward the right. Fig. 3 represents a section on line 3 3 of Fig. 2, showing the cutter, the work, and the chip flowing from the work in elevation.

The same letters and numerals of reference indicate the same parts in all the figures.

In the drawings, $a$ represents a circular cutter, which has a tapering or conical peripheral face $a'$ and a substantially flat face $a^2$, said faces forming a cone-frustum, of which the face $a^2$ is the base. A circular cutting-edge $a^3$ is formed by the intersection of the faces $a'$ $a^2$, and the said faces are relatively disposed so that when the cutting-edge is properly presented to the work the peripheral face $a'$ gives the cutter its clearance while the flat face $a^2$ gives the cutter its rake, the said clearance and rake being such as are commonly provided in a metal-cutting tool which removes a continuous chip by a shaving-cut, the chip flowing from the work in contact with the raking-face $a^2$.

The cutter is mounted in a holder in which it is adapted to rotate on an axis at right angles to the plane of its cutting-edge, and said holder is adapted to present the cutter to the work in the inclined or oblique position shown in the drawings, which causes the presentation to the work of a cutting-edge which is oblique to the axis of the work and extends across the shaving removed, so that the chip is wedged or crowded off laterally and therefore removed by a shearing cut. Said inclined or oblique position also causes the contact of the work with the cutter to rotate the cutter while it is in operation and causes the portion of the cutter with which the chip is in contact to move very nearly in the direction of the natural flow of the chip, so that the friction resulting from contact of the chip with the cutter is reduced to the minimum.

$b$ represents the holder, the bottom portion 2 of which is engaged with a dovetail guide $c$, on a plate or base $c'$, which may be attached to the turret of a lathe, the said plate being intended particularly for attachment to the flat turret of the lathe shown in my Patent No. 457,967. The plate $c'$ has an adjusting-screw $c^2$ engaged with the holder and adapted to adjust the same laterally on the plate.

A portion of the holder is formed as an arm or standard rising from the bottom portion 2, and curved so that its upper portion projects over the piece of work $d$, (the latter being held and rotated by a suitable chuck.) The said arm or standard is provided at its upper portion with a bearing $e$, above the cutter, and the bottom portion 2 is provided with a bearing $e'$, below the cutter, said bearings being separated by a cutter-receiving space and formed to engage the trunnions of journals $f$ $f'$ on the cutter, the bearings being arranged to support the cutter in the oblique position shown. The bearing $e$ is preferably formed in a screw-threaded stud $e^2$, which is adjustable in a threaded socket in the holder to permit the ready removal of the cutter from the holder.

The holder is provided with one or more back-rests $h$, (two being here shown,) each being provided with an antifriction-roller $h^2$, bearing on the work. Said rests are independently adjustable in sockets in the holder and are held in place by set-screws $h'$, so that they may be adjusted to the size of the work. The holder with the cutter and back rests relatively arranged, as shown, constitutes a convenient and effective turning-tool adapted to operate rapidly and with the minimum degree of resistance and friction.

I claim—

A metal-reducing tool or appliance comprising a cutter having a circular cutting edge, a holder composed of a bottom-portion formed to rest on a support on a lathe and an arm or standard rising from said bottom-portion and curved to extend over the work, an adjustable bearing on said arm or standard above the cutter, a bearing in said bottom-portion below the cutter, said bearings being formed to engage trunnions on the cutter and arranged to hold the cutter in an oblique position relatively to the work, a back-rest adjustable toward and from the cutter in a socket formed in the standard-portion of the holder, and a device for securing the back-rest to the holder in any position to which it may be adjusted.

In testimony whereof I have signed my name to this specification, in the presence of two subscribing witnesses, this 8th day of February, A. D. 1894.

JAMES HARTNESS.

Witnesses:
WILBUR F. SMITH,
H. V. E. TERHUNE.